United States Patent
Guernsey et al.

(10) Patent No.: US 9,302,855 B2
(45) Date of Patent: Apr. 5, 2016

(54) CLEANABLE DIVERTER

(71) Applicant: Laitram, L.L.C., Harahan, LA (US)

(72) Inventors: Kevin W. Guernsey, Destin, FL (US); Jonathan J. Bishop, Des Allemands, LA (US); Timothy J. DeRoche, Harahan, LA (US); Kevin L. Gremillion, Prairieville, LA (US); Matthew Vulpetti, New Orleans, LA (US); Brian R. Lee, Kenner, LA (US)

(73) Assignee: Laitram, L.L.C., Harahan, LA (US)

( * ) Notice: Subject to any disclaimer, the term of this patent is extended or adjusted under 35 U.S.C. 154(b) by 5 days.

(21) Appl. No.: 14/338,907

(22) Filed: Jul. 23, 2014

(65) Prior Publication Data

US 2014/0332342 A1 Nov. 13, 2014

Related U.S. Application Data

(63) Continuation-in-part of application No. 13/839,326, filed on Mar. 15, 2013, now Pat. No. 8,985,304.

(60) Provisional application No. 61/668,182, filed on Jul. 5, 2012.

(51) Int. Cl.
*B65G 47/10* (2006.01)
*B65G 47/84* (2006.01)

(52) U.S. Cl.
CPC .................... *B65G 47/844* (2013.01)

(58) Field of Classification Search
CPC .................................................. B65G 47/844
USPC ................. 198/370.02, 370.07, 890
See application file for complete search history.

(56) References Cited

U.S. PATENT DOCUMENTS

| | | | |
|---|---|---|---|
| 2,868,394 A | | 1/1959 | Greller et al. |
| 3,129,803 A | * | 4/1964 | Giulie ............. B65G 17/005 198/437 |
| 4,283,245 A | | 8/1981 | Benoit |
| 4,732,260 A | | 3/1988 | Canziani |
| 5,038,912 A | | 8/1991 | Cotter |
| 5,127,510 A | | 7/1992 | Cotter et al. |
| 5,167,315 A | * | 12/1992 | Doane ............... B65G 47/844 198/440 |
| 5,217,105 A | * | 6/1993 | Sapp ............... B65G 47/844 198/370.02 |

(Continued)

FOREIGN PATENT DOCUMENTS

| | | |
|---|---|---|
| JP | 2000-344323 A | 12/2000 |
| WO | 2014011478 A1 | 1/2014 |

OTHER PUBLICATIONS

International Search Report and Written Opinion of the International Searching Authority, PCT/US2015/037171, mailed Sep. 18, 2015, Korean Intellectual Property Office, Republic of Korea.

*Primary Examiner* — William R Harp
(74) *Attorney, Agent, or Firm* — James T. Cronvich

(57) ABSTRACT

A cleanable shoe-type diverter belt having narrow translatable pushers forming article-diverting shoes. Cam followers on the shoes below the pushers follow guides under the belt along an upper carryway run to translate the shoes along one or more transverse tracks across the width of the belt. Monolithic diverters support the belt on the carryway run and direct the shoes along different paths. Pusher returns in a lower returnway run guide diverted pushers back to a home position.

19 Claims, 18 Drawing Sheets

(56) References Cited

U.S. PATENT DOCUMENTS

| | | | |
|---|---|---|---|
| 5,333,715 A | 8/1994 | Sapp | |
| 5,435,429 A * | 7/1995 | Van Den Goor | B65G 17/005 198/477.1 |
| 5,657,858 A * | 8/1997 | Van Den Goor | B65G 17/005 198/890 |
| 5,909,797 A | 6/1999 | Van Den Goor | |
| 5,921,378 A | 7/1999 | Bonnet | |
| 5,950,798 A | 9/1999 | Bonnet | |
| 5,971,132 A | 10/1999 | Bonnet | |
| 6,041,909 A | 3/2000 | Shearer, Jr. | |
| 6,044,956 A | 4/2000 | Henson et al. | |
| 6,478,144 B1 * | 11/2002 | Sweazy | B07C 3/065 198/370.02 |
| 6,702,106 B1 | 3/2004 | Sweazy | |
| 6,705,452 B2 | 3/2004 | Greve et al. | |
| 6,802,412 B2 | 10/2004 | Lapeyre et al. | |
| 6,923,308 B2 | 8/2005 | Veit | |
| 6,974,019 B2 | 12/2005 | Lapeyre et al. | |
| 7,021,452 B2 | 4/2006 | Horton et al. | |
| 7,628,265 B2 | 12/2009 | Verploegen et al. | |
| 8,985,304 B2 * | 3/2015 | Guernsey | B65G 47/844 198/370.07 |
| 2004/0094387 A1 | 5/2004 | Lapeyre et al. | |
| 2011/0108388 A1 | 5/2011 | Van Den Goor et al. | |
| 2014/0008178 A1 | 1/2014 | Guernsey et al. | |

* cited by examiner

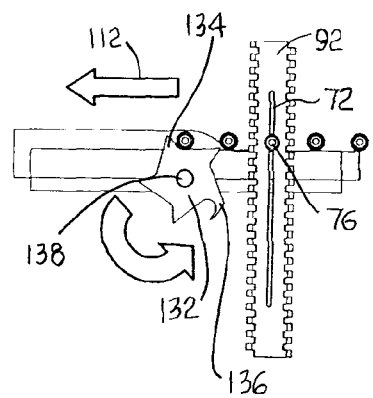
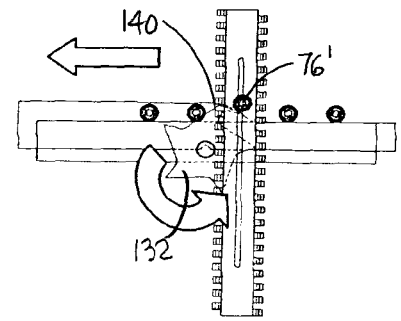
FIG. 16A　　　　　FIG. 16B
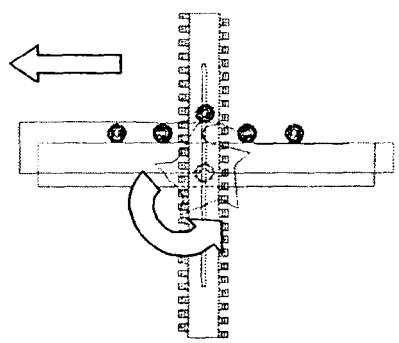
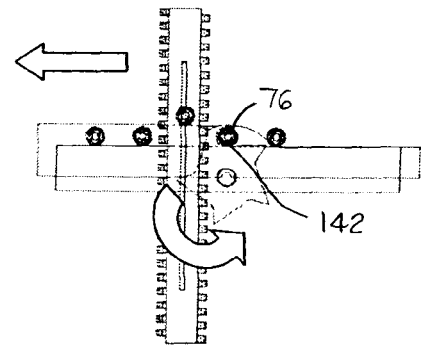
FIG. 16C　　　　　FIG. 16D
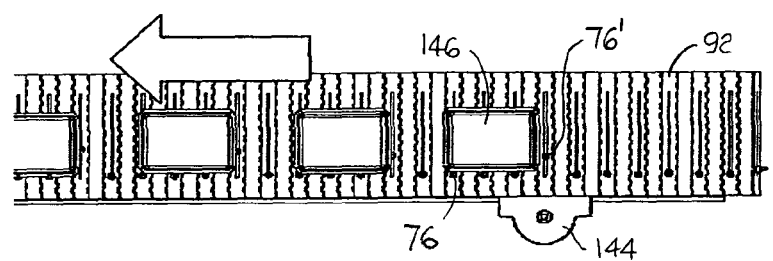
FIG. 17

CLEANABLE DIVERTER

CROSS-REFERENCE TO RELATED APPLICATIONS

This application is a continuation-in-part of co-pending U.S. patent application Ser. No. 13/839,326, filed Mar. 15, 2013, which claims the benefit of U.S. Provisional Patent Application No. 61/668,182, filed Jul. 5, 2012. The disclosures of those applications are incorporated into this application by reference.

BACKGROUND

The invention relates generally to power-driven conveyors and more particularly to shoe-type diverters.

Article diverters, such as shoe sorters, are used to translate articles across the width of a conveyor as the conveyor transports the articles in a conveying direction. Typical shoe sorters include article-pushing elements referred to as shoes that are driven laterally across the conveyor to push articles off one or both sides of the conveyor to one or more outfeed locations. Slat conveyors and modular conveyor belts are used as the platform for the shoes, which ride in tracks extending across the widths of the slats or belt modules. The shoes are conventionally blocked-shaped with depending structural elements that keep the shoe in the track or extend below to engage carryway guides that control the positions of the shoes. Although shoe sorters and other diverters are widely used in package-handling applications, they are not so useful in food-handling and other applications where sanitation is important because they are not easy to clean. Thus, there is a need for cleanable shoe-type diverters.

SUMMARY

One version of a conveyor belt embodying features of the invention comprises a top surface and an opposite bottom surface and a first side and an opposite second side separated by the width of the conveyor belt. A first region of the belt extends inward from the first side toward the second side. A second region extends inward from the second side to the first region. First tracks extend across the width of the conveyor belt in the first region, and second tracks extend across the width of the conveyor belt in the second region. Pushers are arranged to move along the first and second tracks.

Another version of a conveyor belt embodying features of the invention comprises a plurality of rows of one or more belt modules. Each row extends in length from a trailing end to a leading end in a conveying direction and in width from a left side to a right side. The rows of belt modules are arranged end to end. At least some of the rows of belt modules include an intermediate portion that extends in length from the leading end to the trailing end and in width from the left side to the right side. Two or more elongated slots are formed in the intermediate portion from the top side to the bottom side of the conveyor belt. The elongated slots extend in line across the width of the intermediate portion. A pusher movably retained in each of the elongated slots moves along the elongated slot, the pusher having an upper portion above the top side of the intermediate portion and a lower cam portion below the bottom side of the intermediate portion.

In another aspect of the invention, a conveyor system embodying features of the invention comprises at least one conveyor belt and a diverter disposed below the at least one conveyor belt. The at least one belt is divided in width between a first side and a second side of the conveyor into two or more parallel regions extending in length in a conveying direction. The at least one belt includes a plurality of elongated tracks that are spaced apart in the conveying direction and that extend along the width of the at least one conveyor belt. Each of the elongated tracks is confined to one of the parallel regions. Pushers having cam followers extending below the at least one conveyor belt are arranged to translate along the elongated tracks. The diverter has two or more guide surfaces. Each guide surface is associated with one of the parallel regions to contact the cam followers and translate the pushers across the associated region as the at least one conveyor belt advances in the conveying direction.

In another aspect of the invention, a diverter unit comprises a first side rail having a top surface, a second side rail having a top surface, guide members having top surfaces and vertical guide surfaces for guiding pushers on a conveyor belt, and cross members joining the guide members to the first and second side rails. The top surfaces of the first and second side rails and the guide members are coplanar to support a conveyor belt.

In yet another aspect of the invention, a conveyor comprises a conveyor belt extending in length along an upper carryway run in a conveying direction. The conveyor belt has elongated tracks that are spaced apart in the conveying direction and extend along the width of the conveyor belt. Pushers, which include cam followers extending below the conveyor belt, are arranged to translate along the elongated tracks. A diverter, disposed below the conveyor belt in the upper carryway run, has a guide surface to contact the cam followers and translate the pushers across the conveyor belt as it advances in the conveying direction. A pusher return, disposed in a lower returnway run below the upper carryway run, has a guide surface that contacts the cam followers to translate the pushers across the width of the conveyor belt to a home position.

BRIEF DESCRIPTION OF THE DRAWINGS

These features of the invention, as well as other aspects and advantages, are described in more detail in the following description, appended claims, and accompanying drawings, in which:

FIGS. 16A-16D are top plan views illustrating the sequential operation of a rotatable cam-actuated guide mechanism usable with a conveyor belt as in FIG. 10;

FIG. 17 is a top plan view of the conveyor belt of FIG. 10 with the pushers controlled by the guide mechanism of FIGS. 16A-16D;

DETAILED DESCRIPTION

Figure 1:
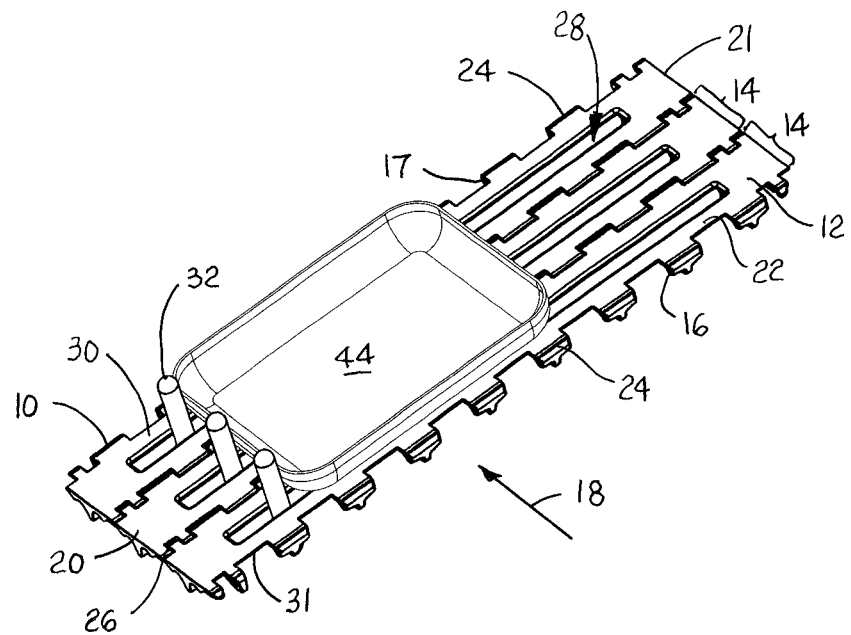
FIG. 1 is an isometric view of a portion of a diverter belt embodying features of the invention.
Figure 2:
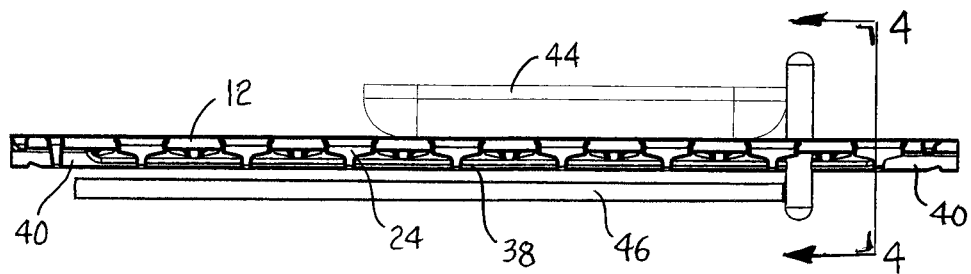
FIG. 2 is a front elevation view of the belt portion of FIG. 1.

FIGS. 1 and 2 show a portion of the conveyor belt usable as an article diverter embodying features of the invention. The conveyor belt 10 is constructed of a series of conveyor belt modules 12 arranged in rows 14. Each conveyor module 12 extends in length from a trailing end 16 to a leading end 17 in a conveying direction 18, i.e., a direction of belt travel. The modules 12 extend in width from a left side 20 to a right side 21. The module has an intermediate portion, in the form of a central deck 22, and hinge elements 24 spaced apart along the trailing and leading ends 16, 17 of the module 12. The hinge elements 24 are interconnected, by hinge pins, for example, at hinge joints 26 between adjacent rows 14. Instead of a modular hinged belt, a slat conveyor belt constructed of slat modules between flanking roller chains could be used.

Figure 4:
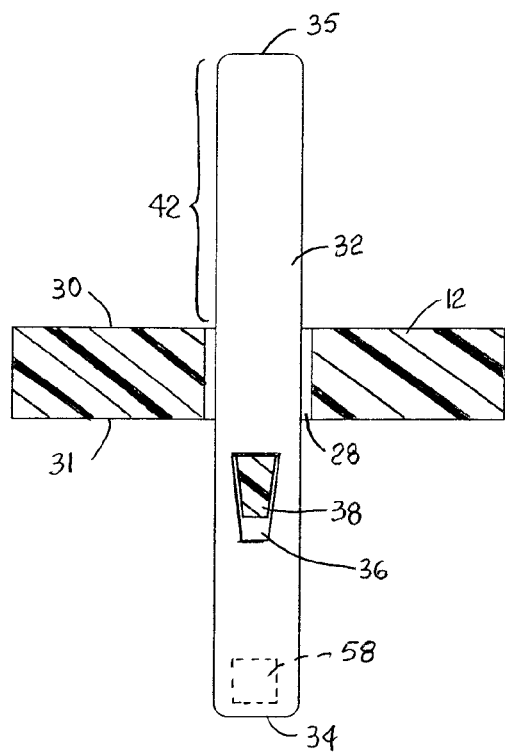
FIG. 4 is an enlarged cross section of the conveyor belt of FIG. 2 viewed along line 4-4.

An elongated slot 28 extends through the deck 22 from a top conveying side 30 to an opposite bottom side 31 and across the majority of the width of the module midway between its two ends 16, 17. A pusher 32, in the form of a peg, is received in the slot 28, as also shown in FIG. 4. The pusher extends from a bottom end 34 to an opposite top end 35. A through hole 36 is disposed in the pusher between its two opposite ends 34, 35. The pusher in this example is realized as a monolithic element homogeneously formed as a single piece by molding, for example. A transverse bar 38 extending across the width of the module below the deck 22 is connected to the underside of the module near the left and right sides 20, 21 by webs 40, as shown in FIG. 2. The bar is received in the pusher's through hole 36. The bar 38, which is parallel to the slot 28, retains the pusher 32 and allows it to translate along the slot. The bar may also serve as a drive bar engaged by drive and idle sprockets in a positively driven conveyor system. The upper portion 42 of the pusher 32 between the pusher's top end 35 and the top side 30 of the deck 22 is used like a shoe to push articles 44 transversely across the module 12 toward either side.

Figure 3:
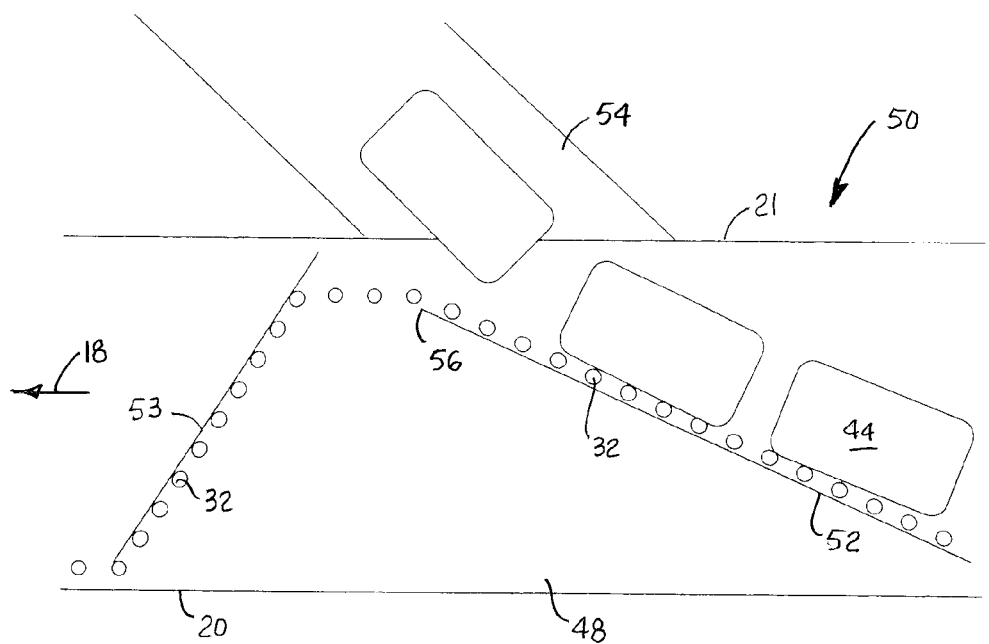
FIG. 3 is a plan schematic of a sorter using a belt as in FIG. 1.

A guide mechanism 46 underlies the belt 10 along an upper carryway 48, as shown in FIGS. 2 and 3, and, along with the belt, forms a diverting conveyor 50, such as a sorter. The guide mechanism 46 shown schematically in FIG. 3 is a conventional system of mechanical guides 52, 53 in the carryway 48 having vertical surfaces that engage the bottom ends 34 of the pushers 32 to divert the pushers across the belt. The bottom ends, acting like keels or cam followers, follow the guides as the belt 12 advances in the conveying direction 18. As shown in FIG. 3, the peg pushers 32 in each module translate as guided by the upstream guide 52. In this example, the article 44, such as a tray, is pushed toward and off the right side 21 of the belt by the pushers to an outfeed conveyor 54 disposed at a specific location along the conveyor. After passing the downstream end 56 of the upstream guide 53, the pushers remain in their transverse position until they reach the downstream return guide 53, which guides the pushers back to the left side 20 of the belt. Of course, many different diverters with multiple outfeed conveyors on both sides and associated guide arrangements can be used besides the one in FIG. 3, which is used as a simple example to describe the operation of a sorter. Furthermore, different guide mechanisms may be used. For example, the pusher can include a magnetic material such as magnetic or ferrous particles or a magnetic or magnetically attractive element (58, FIG. 4), such as a magnet or a piece of iron. The guide mechanism would then include magnetic guides or an electromagnetic array to translate the pushers across the belt.

Figure 5A:
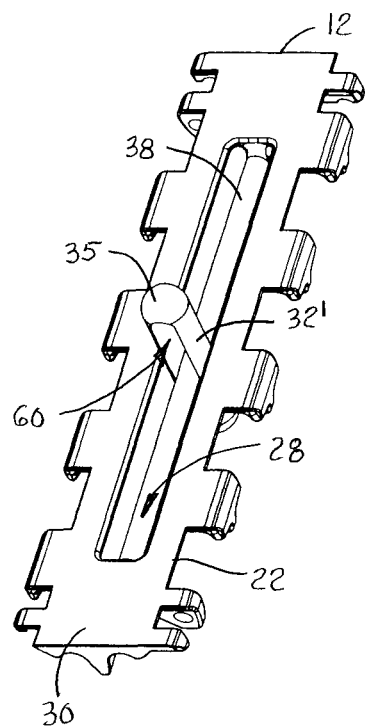
FIGS. 5A and 5B are axonometric views of a module usable in a diverter belt as in FIG. 1 with a slotted, retractable pusher in extended and retracted positions.
Figure 5B:
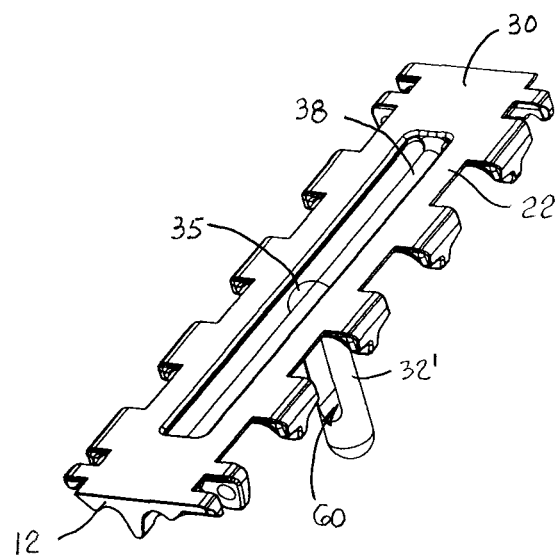

Another version of the pusher is shown in the module 12 of FIGS. 5A and 5B. The pusher 32' has a vertically elongated, slot-like through hole 60 receiving the transverse bar 38. The elongated through hole extends close to the top end 35 of the pusher 32' and allows it to be retracted to a level below the top side 30 of the deck 22. A horizontal cam surface 61 in the carryway is positioned high enough to force the bottom side 34 of the pusher 32' upward toward the slot 28 to maintain the pusher in an extended position above the deck. When the horizontal cam surface is lowered or absent, the pusher 32' falls into its retracted position below the top side of the deck.

Figure 6:
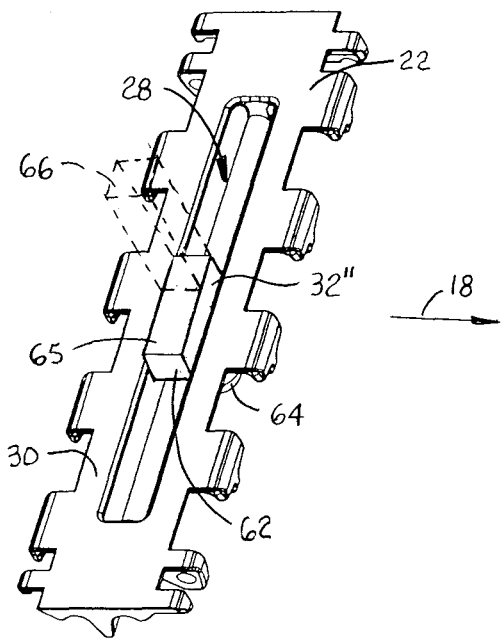
FIG. 6 is an axonometric view of a module usable in a diverter belt as in FIG. 1 with a pusher having a parallelepiped-shaped article-contacting portion above the deck.

Yet another version of the pusher is shown in FIG. 6. The pusher 32" has a parallelepiped-shaped article-contacting platform portion 62 that extends above the top side 30 of the deck 22 and a bottom cam-follower 64 like that for the pusher of FIG. 1. The maximum dimension of the article-contacting portion 62 in the conveying direction 18 is slightly less than the width of the slot 28 in the conveying direction so that the pusher 32" does not overlap the top side 30 of the deck 22. The height of the pusher 32" could be even less than indicated in FIG. 6 to form a platform 65 elevated slightly above the top side 30 to engage the bottoms of conveyed articles, lift them slightly, and carry them across the deck 22. The pusher 32" could include a vertical peg pushing portion 66 that forms an L shape with the horizontal article-contacting supporting platform portion 62.

Unlike conventional blocky shoes, the narrow pegs 32, 32' of FIGS. 1-5 and the narrow parallelepiped-shaped pushers 32" of FIG. 6 do not overlap and occlude any portion of the deck 22—top or bottom. That makes the top side 30 of the belt accessible and easy to clean.

Figure 7A:
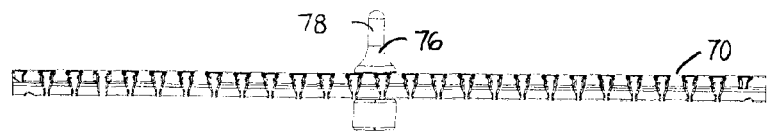
FIGS. 7A-7D are front views of another version of a belt module embodying features of the invention.
Figure 7B:
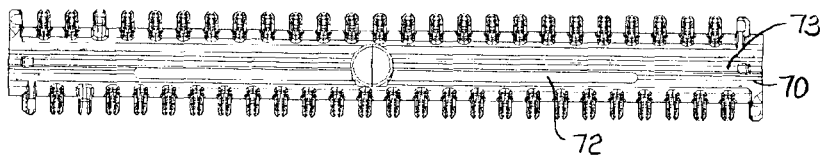
Figure 7C:
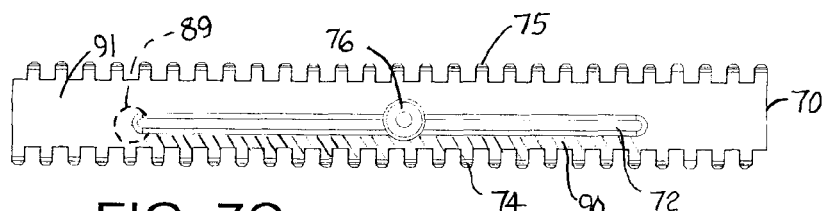
Figure 7D:
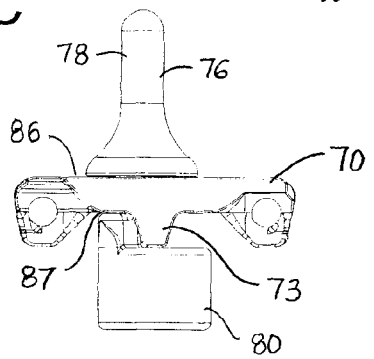

Another version of a conveyor belt module with a peg pusher is shown in FIGS. 7A-7D. The belt module 70 is similar to the module 12 of FIG. 5A, but differs in that it has an elongated slot 72 that is longitudinally offset from its central drive bar 73. In other words, the slot is closer to a first end 74 of the module than to its opposite second end 75. A peg pusher 76 is slidably retained in the slot 72. The pusher 76 has an upper portion 78 and a lower cam-follower portion 80 joined by an intermediate shank portion 82, as shown in FIGS. 8A and 8B. The pusher in this example is realized as a monolithic element homogeneously formed as a single piece by molding, for example. The upper portion is pawn-shaped and flares outward toward the bottom to form a skirt 84 that slides along the top conveying surface 86 of the belt module 70. The narrow shank 82 resides in the slot 72. The lower portion 80 has an upper shoulder 88 that slides along the bottom surface 87 of the module. The height of the shank 82 is slightly greater than the thickness of the module 70 at the slot. The height of the shoulder portion 88 is slightly greater than the height of the drive bar 73 so that the cam follower 80 is below the bottom of the drive bar. The outer dimensions of the pusher slightly above the top conveying side 86 and slightly below the bottom side 87 of the intermediate portion are slightly greater than the width of the slot—enough to retain the pusher in the slot. The narrow portion 90 of the deck 91 of the plastic module between the slot 72 and the first end 74 and shown hatched in FIG. 7C is flexed upward or downward to temporarily widen the slot to admit the pusher into place. Once the pusher is in place the narrow portion 90 is released, and the module 70 returns to its natural state retaining the pusher 76. Alternatively, the slot 72 could have a wider access opening 89 at one end that is large enough in diameter to admit the pusher 76 into the slot. The placement of guides under the belt would confine the pusher to the narrow main portion of the slot.

Figures 8C, 8D:
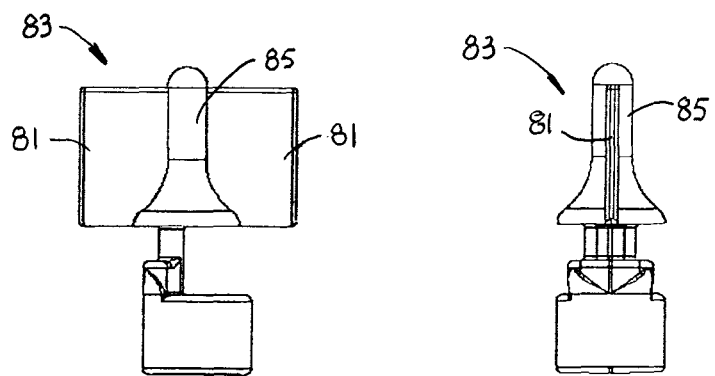
FIGS. 8A and 8B are side and front elevation views of a pusher used in a conveyor belt module as in FIGS. 7A-7D, and FIGS. 8C and 8D are side and front elevation views of a pusher as in FIGS. 8A and 8B with wings.
Figure 8A:
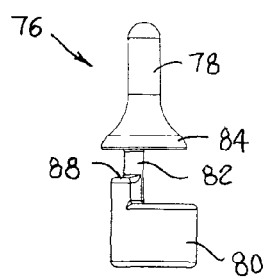
Figure 8B:
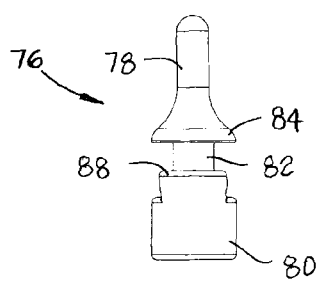

The pusher of FIGS. 8A and 8B is outfitted with wings 81 in FIGS. 8C and 8D to form a pusher 83 better suited to pushing non-rigid articles, such as bags. The wings extend from opposite sides of a central peg 85 parallel to the conveying direction when installed in a conveyor belt. Together the wings 81 form a vertical plate for pushing articles across the belt.

Figure 9:
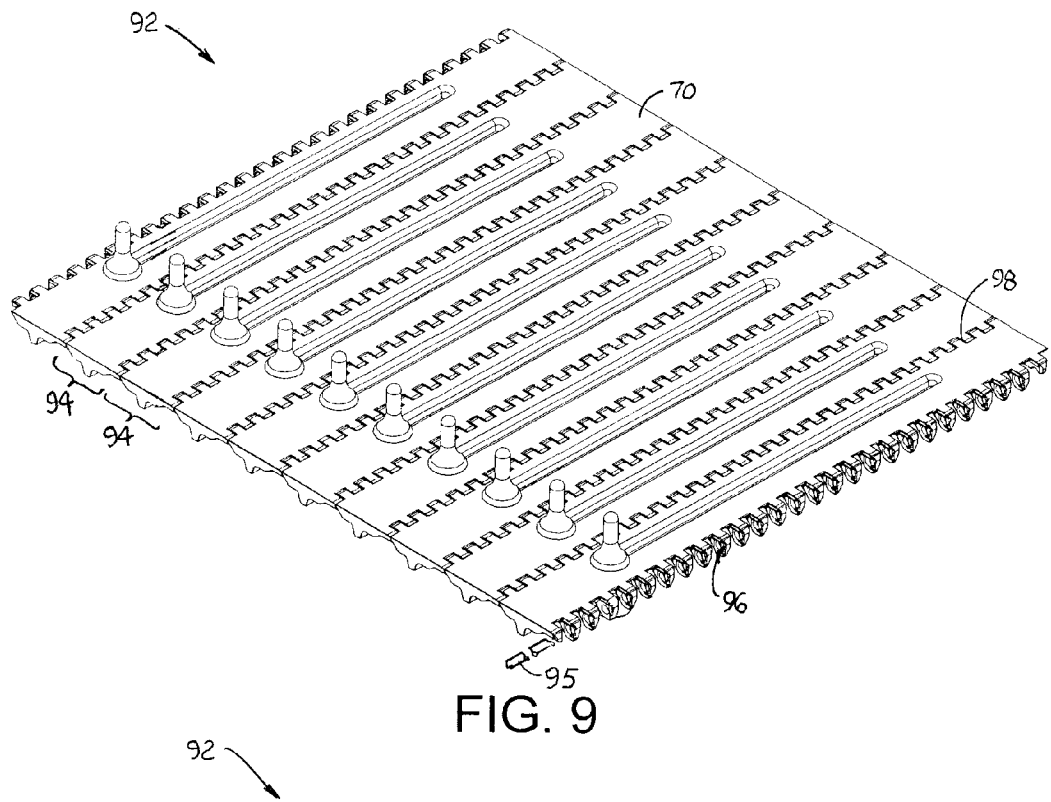
FIG. 9 is an isometric view of a portion of a conveyor belt constructed of modules as in FIGS. 7A-7D.
Figure 10:
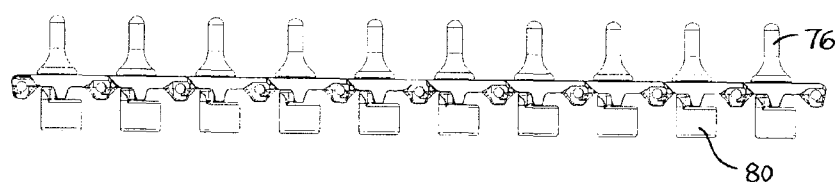
FIG. 10 is a side elevation view of the conveyor belt of FIG. 9.

A portion of the conveyor belt 92 constructed of rows 94 of the belt modules 70 is shown in FIGS. 9 and 10 on an upper carryway run. The rows are joined by hinge rods 95 received in the aligned openings 96 of interleaved hinge elements 98 of adjacent rows. Instead of having pusher modules 70 in each row, the belt 92 could have pusher modules interspersed with pusherless and slotless standard modules.

Figure 11:
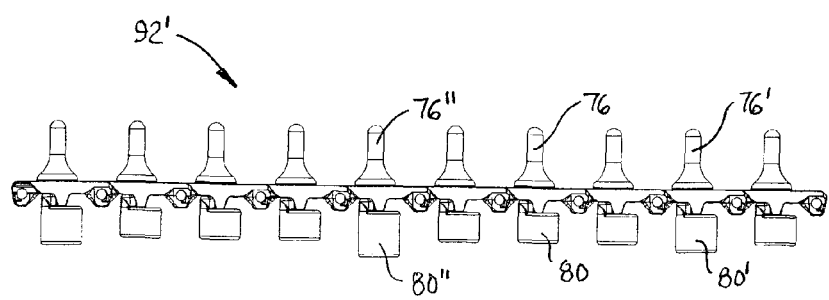
FIG. 11 is a side elevation view of a conveyor belt as in FIG. 9, but having cam followers of different heights on the pushers.
Figure 12:
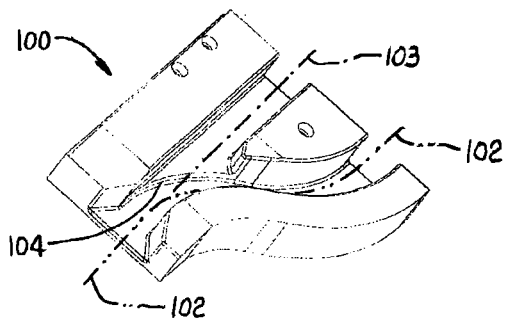
FIG. 12 is an axonometric view of one version of a guide mechanism usable with a conveyor belt as in FIG. 11.

As shown in the side view of FIG. 10, all the lower cam-follower portions 80 of the pushers 76 extend below the belt the same distance to the same depth. In another version, a conveyor belt 92', shown in FIG. 11, has lower cam-follower portions 80, 80', 80" on the pushers 76, 76', 76" that extend downward different distances to different depths. When used with a guide 100, 100' as in FIG. 12 or FIG. 13, the pushers 76, 76', 76" can be guided differently. The guide 100 of FIG. 2 is mounted in the conveyor carryway under the conveyor belt. The guide 100 has a deep channel 102 that veers to the right. A shallow channel 103 branches off from the deep channel, but in line with its upstream portion. The pushers 76" having the deepest cam followers 80" encounter a guide surface in the form of a ledge 104 at the branch of the deep and shallow channels 102, 103. The ledge guides the pushers 76" across the belt. The pushers 76, 76' having shallower cam followers 80, 80' clear the ledge 104 and maintain their lateral positions on the belt. The side walls of the channels 102, 103 form guides for the pushers.

Figure 13:
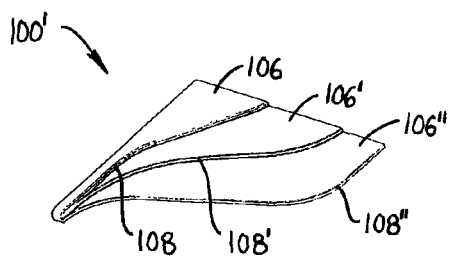
FIG. 13 is an isometric view of a terraced guide mechanism usable with a conveyor belt as in FIG. 11.

Another version of a diverting guide 100' underlying the conveyor belt in the carryway is shown in FIG. 13. This guide has three levels, or terraces 106, 106', 106", at three different depths. Ledges 108, 108', and 108" serve as guide surfaces for the pushers. The ledge 108 is between the top terrace 106 and the intermediate terrace 106'. The ledge 108' is between the intermediate terrace 106' and the bottom terrace 106". The ledge 108' forms the outer edge of the bottom terrace 106". The pushers 76" with the deepest cam followers 80" are guided across the belt by the bottom ledge 108". The intermediate and shallow cam followers 80', 80 clear the bottom ledge. The pusher 76' with the intermediate cam follower 80' is guided by the intermediate ledge 108', and the shallow cam follower 80 by the shallow ledge 108. In this way, the terraced guide 100' can translate the pushers 76, 76', 76" to different lateral positions across the width of the conveyor belt 92'.

Figure 14:
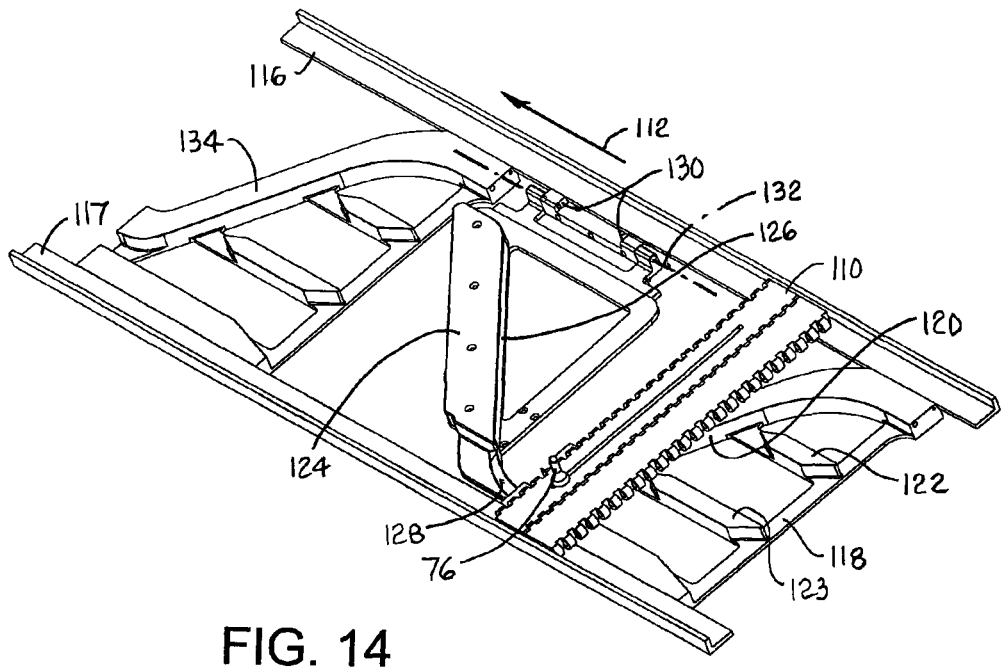
FIG. 14 is an isometric view of a portion of a carryway with fixed guide mechanisms and a retractable guide mechanism for guiding the pushers of a conveyor belt as in FIG. 10.
Figure 15A:
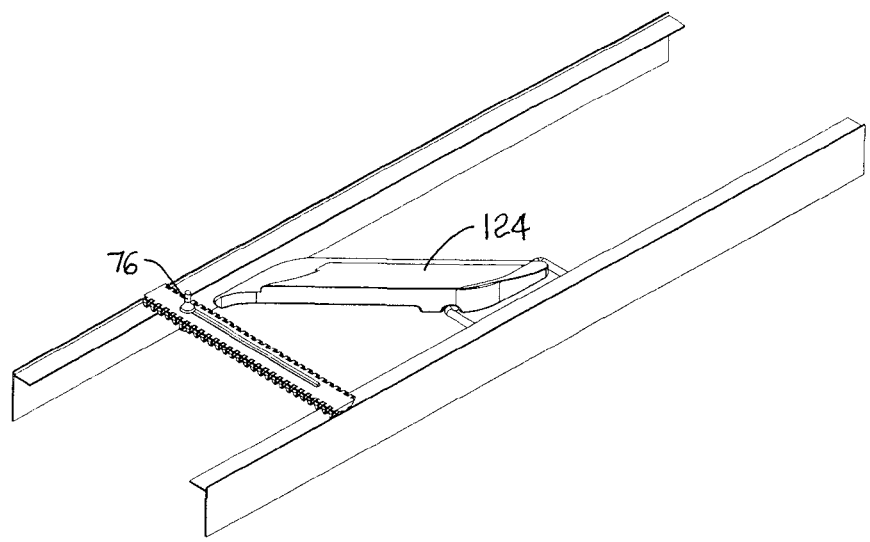
FIG. 15A is an isometric view of another version of a retractable guide mechanism usable with a conveyor belt as in FIG. 10, and FIGS. 15B and 15C are side elevation views of the retractable guide mechanism in retracted and unretracted positions.
Figure 15B:
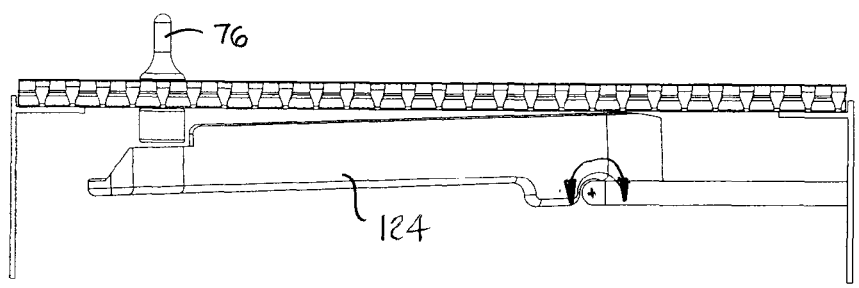
Figure 15C:
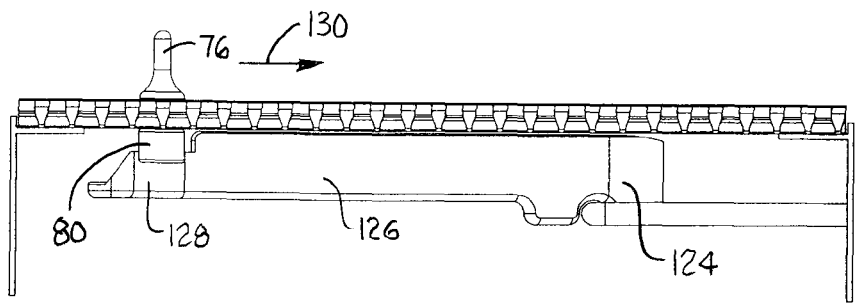

FIG. 14 shows two rows of a conveyor belt 110 advancing along a carryway in a direction of belt travel 112. A guide mechanism 114 is held in place under the conveyor belt by a pair of frame members 116, 117. The guide mechanism comprises a funnel-like upstream guide 118 with a curved guide wall 120 that guides all the cam followers and the pushers 76 to the left side of the belt. The top surfaces of islands 122, 123 provide support to the bottom surface of the belt 110. A selectively retractable diverting guide 124 has a diverter wall 126 with a curved input hook 128 that guides the pushers 76 to the right side of the belt when the guide is in a raised diverting position, as shown in FIG. 14. The guide is pivotably attached to the right-side frame member 116 by a hinge 130 that allows the guide to pivot about its pivot axis 132 downward to a retracted position, in which the pushers are not diverted. An actuator (not shown in the drawings), such as an air or hydraulic cylinder, a motor and gears, a solenoid, or other actuating device, is used to pivot the guide 124 between the retracted (non-diverting) position and the unretracted (diverting) position. The actuator can be controlled by a controller that receives sensor signals indicating an article's passing a certain location along the carryway and times the actuation of the actuator accordingly. A return funnel 134, identical to the input funnel in this example, guides the pusher 76 back to the left side of the conveyor belt. FIGS. 15A and 15B show the guide 124 in the retracted (non-diverting) position, allowing the pusher 76 to pass through without diverting. In FIG. 15C, the guide 124 is shown in an unretracted (diverting) position.

The hook portion 128 of the guide wall 126 intercepts the cam follower 80 of the pusher 76 and guides it across the belt to the right-hand side as indicated by arrow 130. In this example, the guide is swiveled about a hinge by an actuator (not shown), such as a linear actuator or a motor-driven rotating hinge. But the guide can be selectively retracted in other conventional ways. For example, the entire guide could be translated up into an upper diverting position and down into a lower non-diverting position by a conventional linear actuator.

FIGS. 16 and 17 show a cam-wheel guide mechanism for registering and metering conveyed articles. The cam wheel 132 in this example has five lobes: (a) four identical cam paddles 134 and (b) one diverting cam 136 equally spaced around the wheel's periphery. The circumferential spacing of the paddles and the diverting cam match the linear spacing, or pitch, of the slots 72 and the pushers 76. The cam wheel 132 is passive and pivots about a central pivot pin 138 defining an axis perpendicular to the plane of the conveyor belt 92. As the conveyor belt 92 advances in the direction of belt travel 112, the cam followers below the belt on the pushers 76 contact the paddles 134 to rotate the wheel through one-fifth of a complete rotation (72°) without changing the position of the pushers on the track 72, as shown in FIG. 16A. When the leading edge 140 of the diverting cam 136 contacts a pusher 76', it forces that pusher along the track, as shown in FIGS. 16B and 16C. The next pusher then engages a rear edge 142 of the diverter cam to rotate the cam another 72°, as shown in FIG. 16D. With the cam wheel 132 of FIG. 16A-D mounted in a housing 144 under a side edge of the conveyor belt 92, as in FIG. 17, every fifth pusher 76' is positioned away from the reset position of the other pushers 76. The four consecutive pushers 76 at the reset position serve to register all the conveyed articles 146 at the same lateral position across the width of the belt. The offset fifth pushers 76' meter the articles at equally spaced locations along the length of the belt. Cam wheels with different geometries can be used to achieve different effects.

FIGS. 18-27 depict various conveyor configurations using a pusher-belt diverter as in FIGS. 1-15 in different conveying applications.

Figure 18:
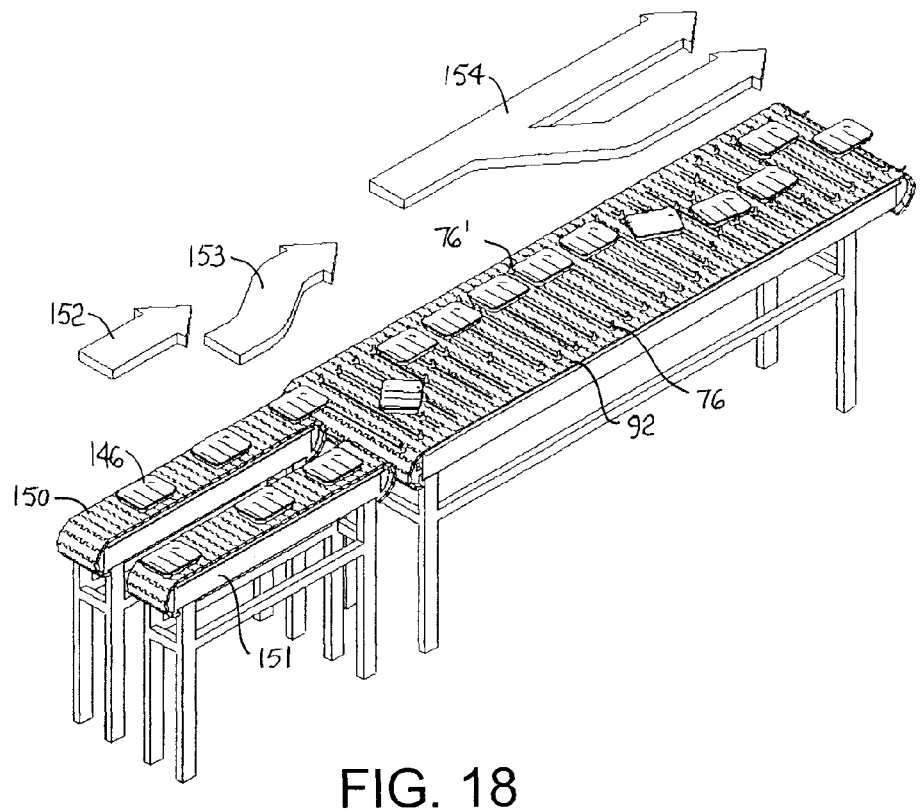
FIG. 18 is an isometric view of a peg-diverter belt as in FIG. 1 or FIG. 10 used in an infeed balance application.

FIG. 18 shows an infeed-balance configuration. Two infeed conveyors 150, 151 feed articles 146 in two lanes onto a conveyor belt 145 having two pushers 147, 147' (a right-side pusher 147 and a left-side pusher 147') in each slot 72. The pushers are arranged to have a left-side row of pushers and a right-side row of pushers as the belt 145 enters the infeed end of the carryway. The left-side pushers 147' remain in the reset position as indicated by arrow 152. The right-side pushers are guided to divert the articles on the right-side infeed conveyor 151 to the left, as indicated by arrow 153, aligned with the articles from the left-side infeed conveyor 150. A fixed, non-retractable guide can be used for the diverter. A downstream guide, indicated by arrow 154, selectively guides left-side pushers 147' across the belt or leaves them in place to divert articles to the right or allow them to continue straight through along the left side. The right-side pushers 147 may optionally be guided by a fixed guide to align the diverted articles along the right side of the conveyor. In this way, the imbalances in the flow between the two infeed conveyors can be balanced upon exit from the pusher-belt diverter. In the example of FIG. 18 and all the following examples, the arrows indicate the geometry of the guides and the diversion paths of the pushers.

Figure 19:
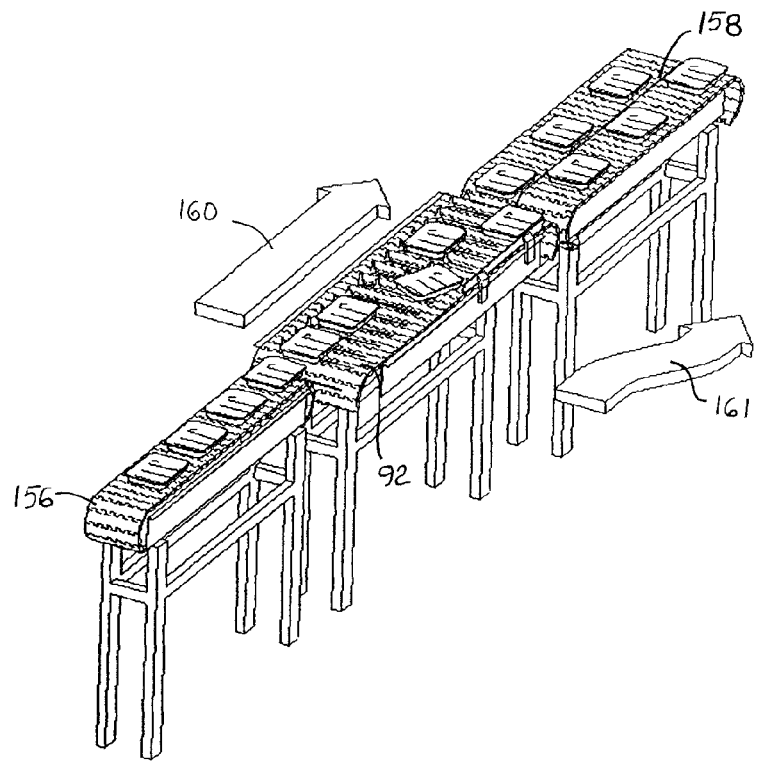
FIG. 19 is an isometric view of a peg-diverter belt used in a switch application.

FIG. 19 shows a switch configuration in which articles supplied by a single infeed conveyor 156 are switched from a single lane into two output lanes on an outfeed conveyor 158. The pusher-belt diverter selectively passes an article from the single file straight through (arrow 160) along the left side or diverts to the right side (arrow 161) of the pusher belt 145 to form the two lanes of articles.

Figure 20:
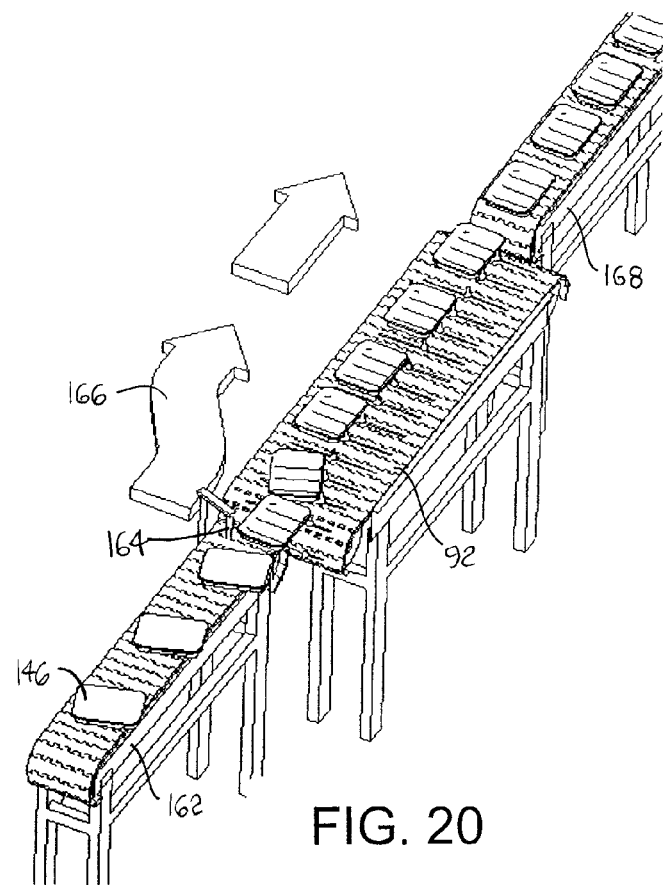
FIG. 20 is an isometric view of a peg-diverter belt used in a simple alignment application.

Simple alignment of a stream of articles is achieved with the conveyor configuration of FIG. 20. Articles 146 on an infeed conveyor 162 are pivoted by a bumper 164 as they enter the pusher belt 145. A guide diverts the incoming articles, as indicated by arrow 166, and aligns them on the belt in line with an outfeed conveyor 168. A fixed, non-retractable guide can be used in this configuration.

Figure 21:
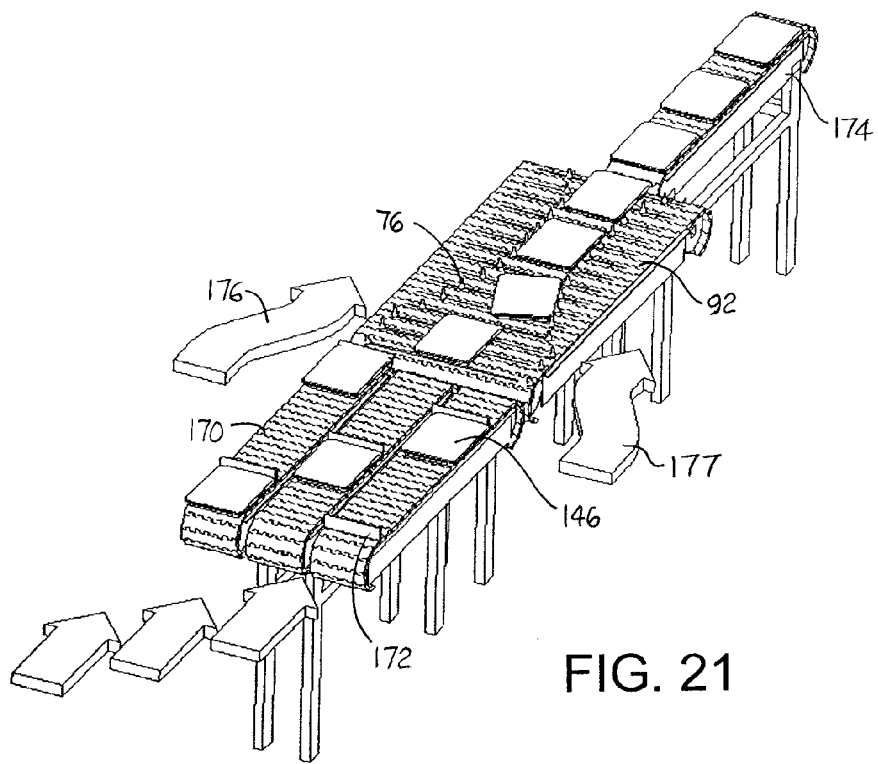
FIG. 21 is an isometric view of a peg-diverter belt used in a timed-infeed merge application.

A three-to-one merge-conveyor configuration is shown in FIG. 21. Three parallel infeed conveyor belts 170 with registration flights 172 meter and deliver articles 146 to the pusher belt 145 one at a time from each infeed belt in round-robin fashion. A guide guides the pushers 147 from outside positions to inner positions to plow the articles into a single file aligned with an outfeed conveyor 174 as indicated by arrows 176, 177. Fixed guides can be used to guide the pushers 147.

Figure 22:
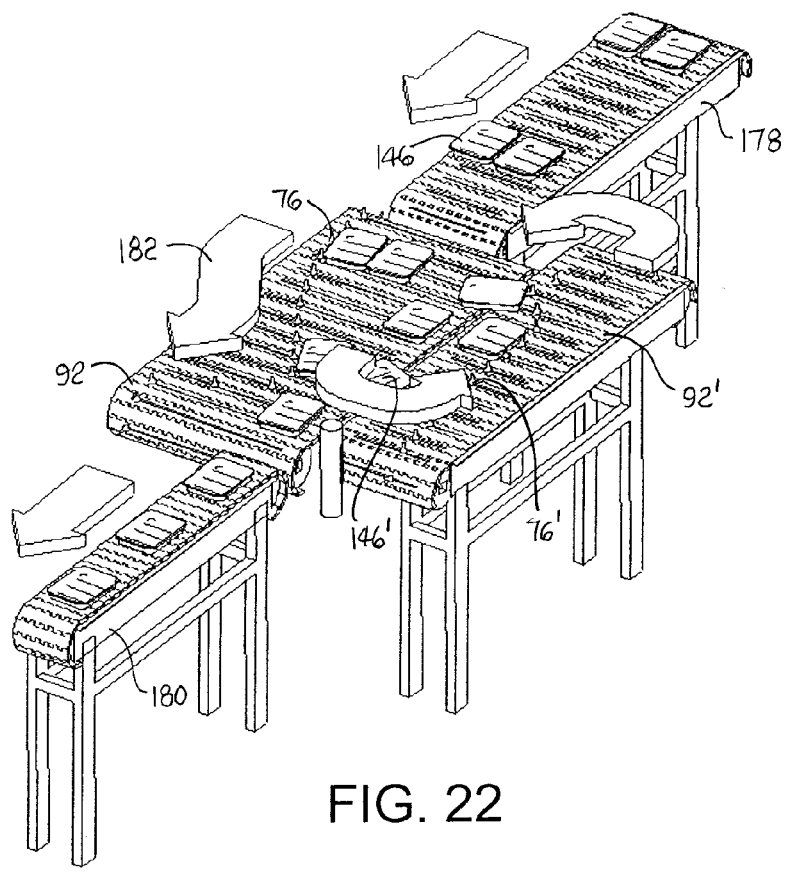
FIG. 22 is an isometric view of two peg-diverter belts used in a recirculating singulation application.

FIG. 22 depicts a singulator with recirculation to prevent articles from exiting side by side. An infeed conveyor 178 is shown delivering articles 146 two abreast to the pusher belt 145. The pushers 147 are guided to plow the articles toward one side to form a single file aligned with an outfeed conveyor 180, as indicated by arrow 182. Side-by-sides 146' are pushed off the side of the pusher belt 145 onto a recirculation pusher belt 145' running in the opposite direction. The guide for the recirculation belt 145' positions its pushers 147' to direct the recirculated articles 146' back onto the first pusher belt 145 to be singulated. Fixed guides can be used to position the pushers 147.

Figure 23:
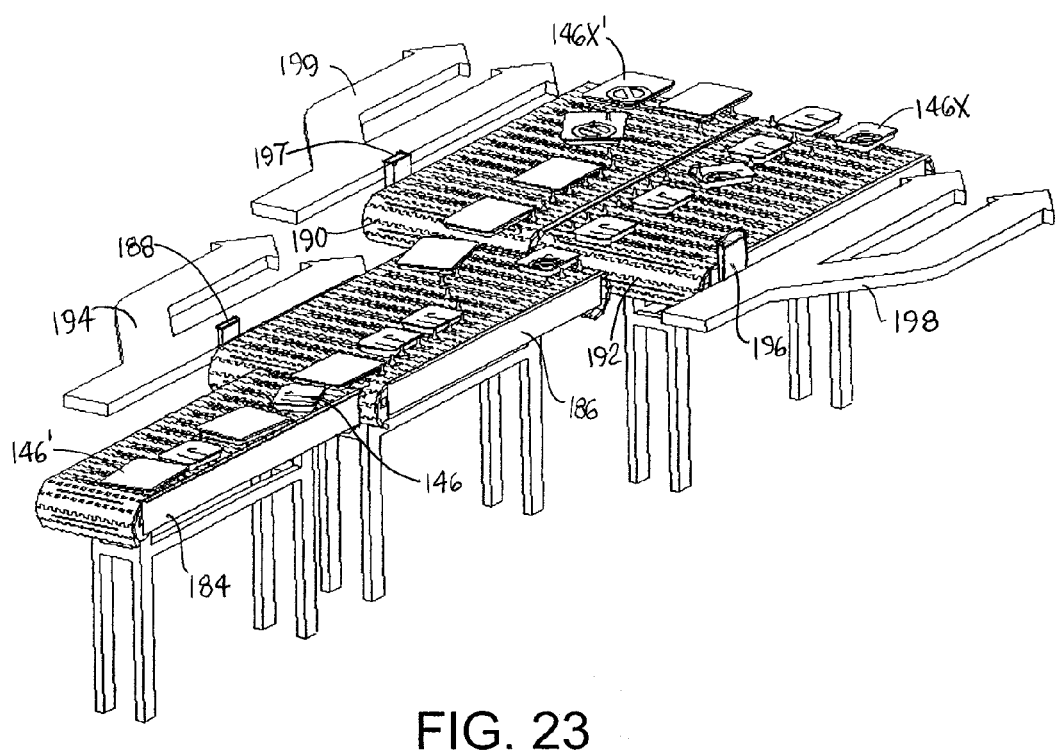
FIG. 23 is an isometric view of three peg-diverter belts used in a size-sorting-with-rejection application.

The conveyor configuration of FIG. 23 can sort articles of different sizes and selectively reject articles. An infeed conveyor 184 delivers small 146 and large 146' articles to a pusher-belt diverter 186 that sorts the articles by size. A size sensor 188 sends a signal to a guide under the belt to selectively divert large articles to a left-side pusher-belt diverter 190 and small articles to a right-side pusher-belt diverter 192 as indicated by arrow 194. Like the size sensor, quality sensors 196, 197 send signals indicative of product quality to the associated guide mechanisms for each quality diverter 190, 192 to selectively divert rejected articles 146X and 146X', as indicated by arrows 198, 199.

Figure 24:
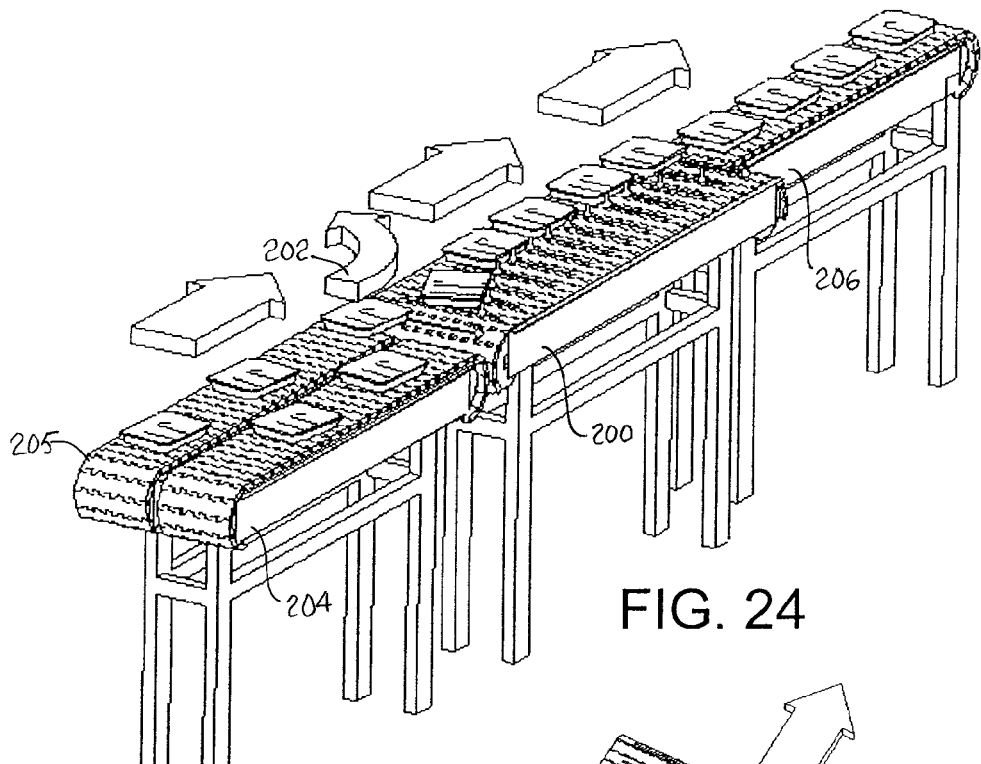
FIG. 24 is an isometric view of a peg-diverter belt used in a simple merge application.

The simple merge conveyor of FIG. 24 uses a pusher-belt diverter 200 with a fixed diverter guide, whose operation is indicated by arrow 202, to merge two lanes of articles from two side-by-side infeed conveyors 204, 205 feeding articles one at a time to the pusher-belt diverter. The merged articles are delivered single file to a downstream outfeed conveyor 206.

Figure 25:
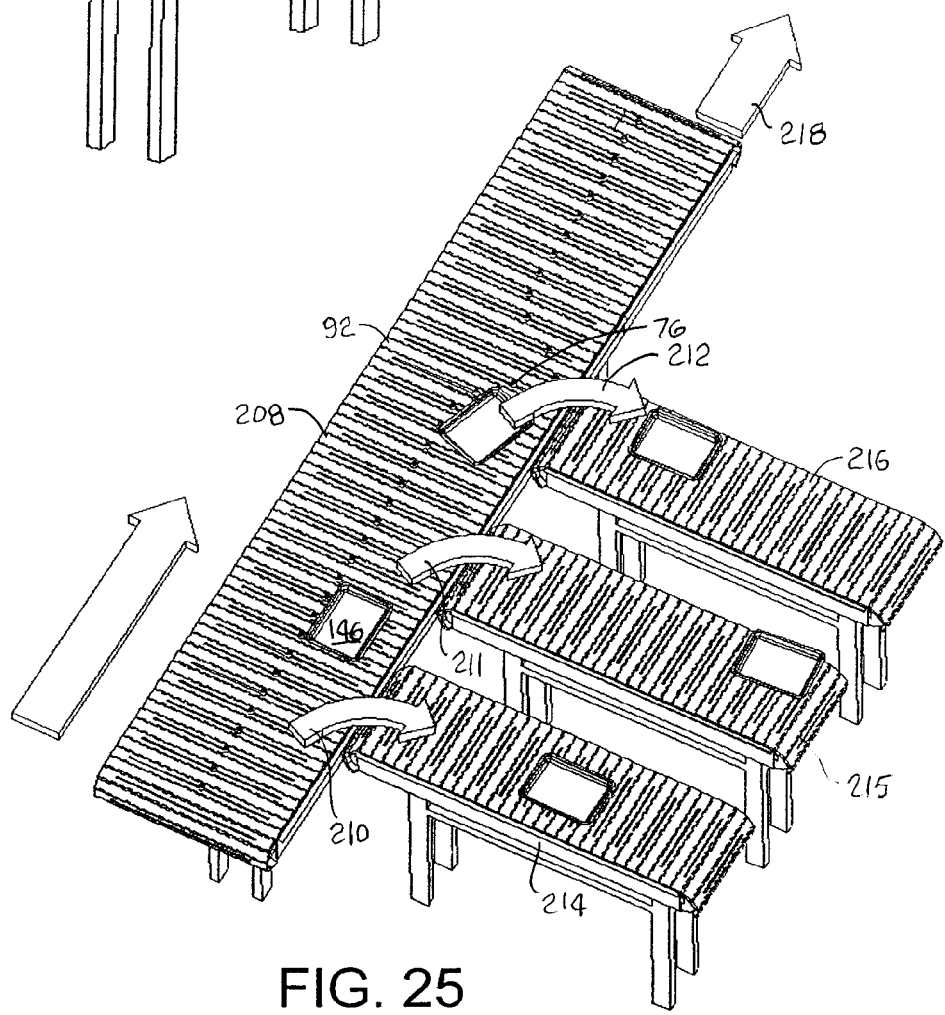
FIG. 25 is an isometric view of a peg-diverter belt used in a sorting application.
Figure 26:
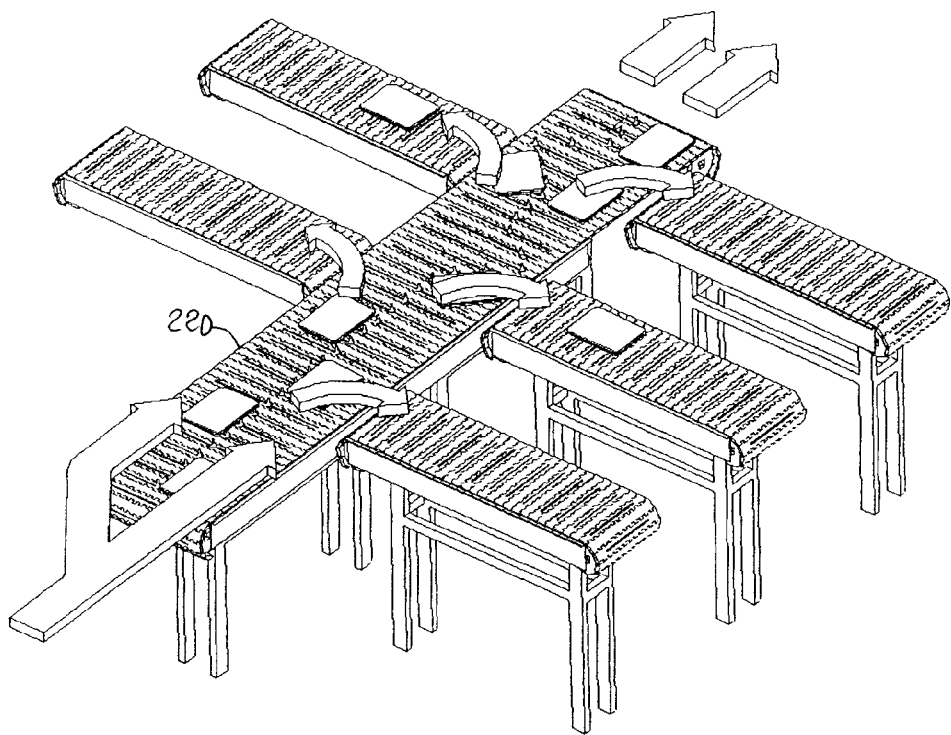
FIG. 26 is an isometric view of a peg-diverter belt used in a two-lane sorting application.

In the sorter shown in FIG. 25, articles 146 on a pusher-belt diverter 208 are diverted by selectively actuated guides underlying the peg belt 145 at sequential locations indicated by arrows 210, 211, 212. When a guide is actuated, it directs the pushers 147 to push the articles off the side of the pusher-belt diverter onto an associated one of the sorting conveyors 214, 215, 216. If none of the guides is actuated for an article, the article continues to advance off the end of the pusher belt 145, as indicated by the arrow 218. The pusher-belt diverter can also be operated as a two-lane sorter as shown in FIG. 26 to sort articles off either side of the diverter 220 to multiple sorting conveyors.

Figure 27:
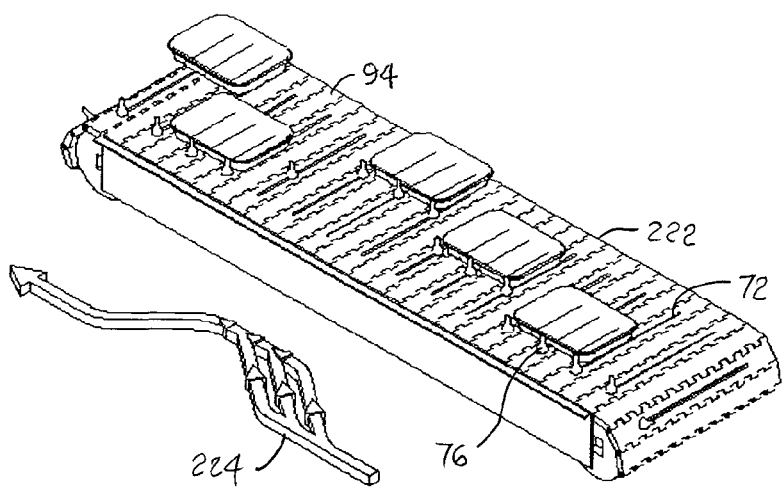
FIG. 27 is an isometric view of a peg-diverter belt illustrating multiple consecutive peg pushers translated in parallel to maintain article orientation during diversion.

The pusher-belt diverter 222 of FIG. 27 diverts articles from one lane to another without changing the articles' orientations. The guide has three parallel guide walls as indicated by the three paths in the arrow diagram 224. The three paths are spaced apart from each other by the spacing, or pitch, of the pushers 147 and their slots 148. With this configuration, three pushers are translated across the belt 145 simultaneously, which translates an article more or less centered on the three pushers from the left lane to the right lane without pivoting. If the guide is not actuated, the pushers remain in their reset position to maintain an article in the left lane.

Figure 28A:
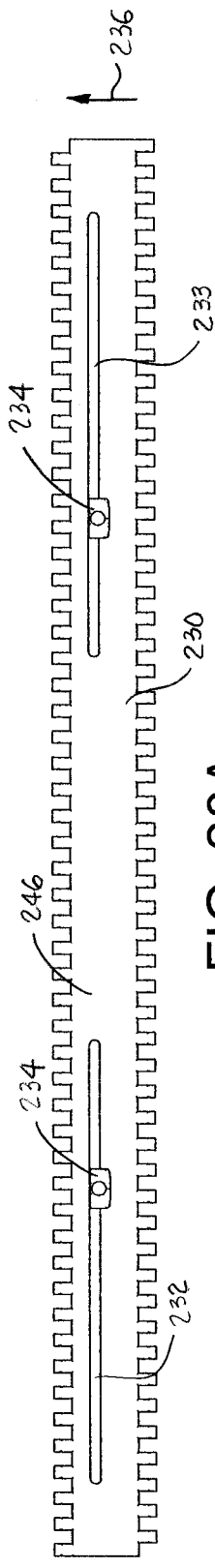
FIGS. 28A-C are top, front elevation and side views of a peg-diverter belt module embodying features of the invention, including left- and right-hand slots with a pusher in each.
Figure 28B:
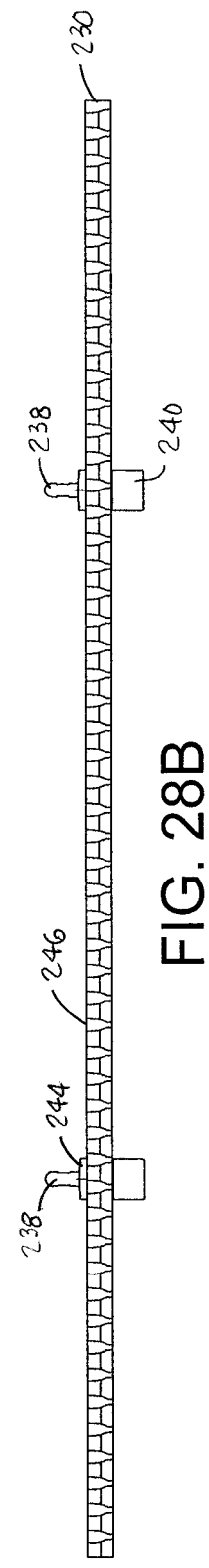
Figure 28C:
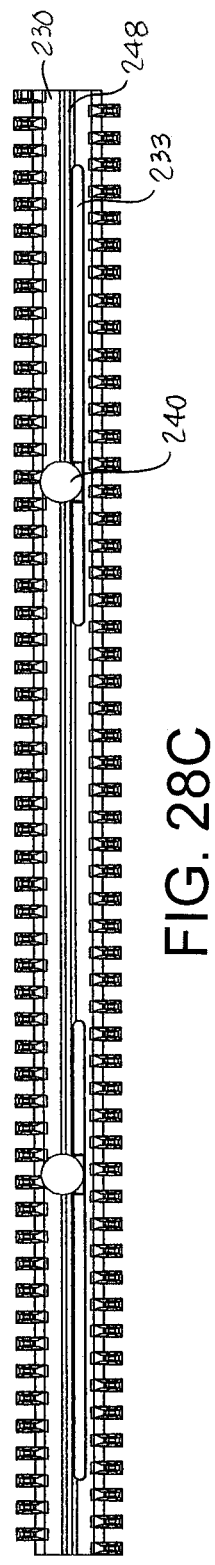

Another version of a pusher module for a conveyor is shown in FIGS. 28A-C. The module 230 has two transverse tracks in the form of elongated slots 232, 233 that extend through the thickness of the module. A pusher 234 translates along the length of each slot. The slots 233, 234 in this example are shown aligned, of the same length, and elongated in the width direction of the module 230. But the slots could be offset from each other in the conveying direction 236 and could be of different lengths. Or a module could be made with a single slot on one side of the module, e.g., the left side, to be used with other modules with a single slot on the other side, i.e., the right side. Furthermore, each module could have more than two slots.

Figure 29:
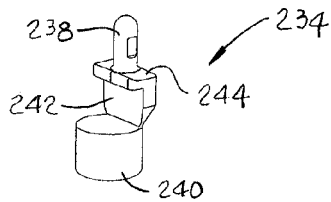
FIG. 29 is a pictorial of a pusher usable in the belt module of FIG. 28.

The pusher 234, as also shown in FIG. 29, has an upper peg portion 238 and a lower cam follower portion 240 joined by an intermediate shank portion 242. The upper peg portion 238 extends from a shoulder 244 that slides along the top conveying surface 246 of the module 230. The narrow shank portion 242 extends through the slot 232, 233. The lower cam follower portion 240 rides along the slot just below the bottom of the module's drive bar 248.

Figure 30:
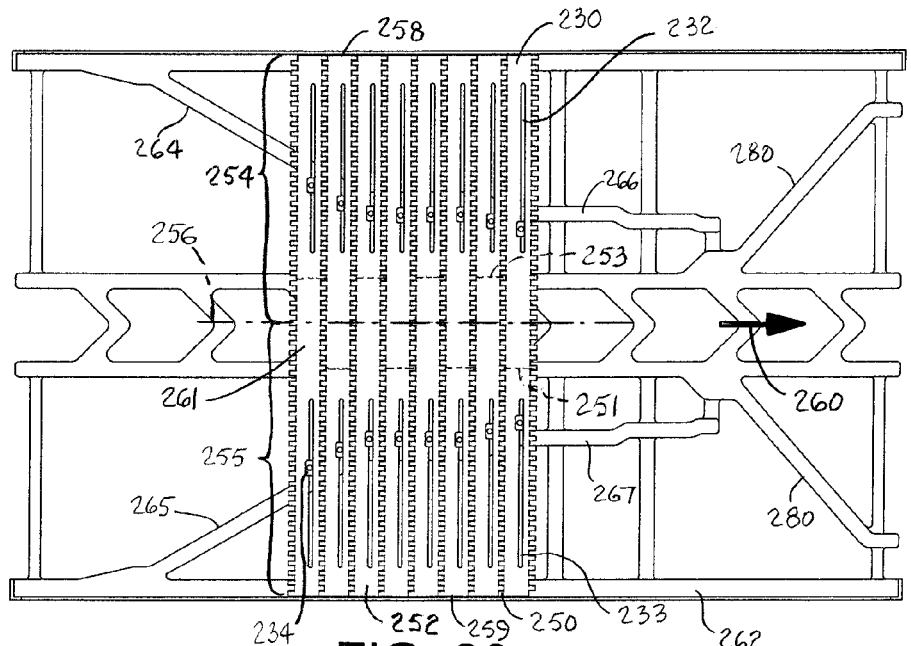
FIG. 30 is a top plan view of a portion of a peg-diverter belt made up of the modules of FIG. 28 being guided by a monolithic stepped diverting guide.

FIG. 30 shows a portion of a conveyor belt constructed of rows of pusher modules 230 linked together at hinge joints 250. Each row could consist of a single module 230 extending the entire width of the belt, or each row could include two or more side-by side modules, such as a pair of modules separated at offset seams 251, 253 and connected with other rows in a bricklay pattern. The belt 252 is divided into two parallel regions: a first region 254 and a second region 255. The first region 254 extends inward from a first side 258 of the belt toward an opposite second side 259. The second region 255 extends inward from the second side 259 to the first region 254. The two regions can be considered to meet between pusher tracks in a middle region 261 of the belt, for example, at the centerline 256. Both regions extend in length in the conveying direction 260. Thus, the pusher belt 252 shown in FIG. 30 advancing in the conveying direction 260, has pusher tracks defined by the first slots 233, in the left region 254 and pusher tracks defined by the second slots 232, in the right region 255. The parallel tracks in each region are spaced apart from each other in the conveying direction 260. Instead of a single conveyor belt, two or more conveyor belts running side by side could be used. For example, in FIG. 30 the first region 254 could reside entirely on a first conveyor belt, and the second region 255 could reside entirely on a parallel second conveyor belt separated from the first conveyor belt at the centerline 256.

Figure 31:
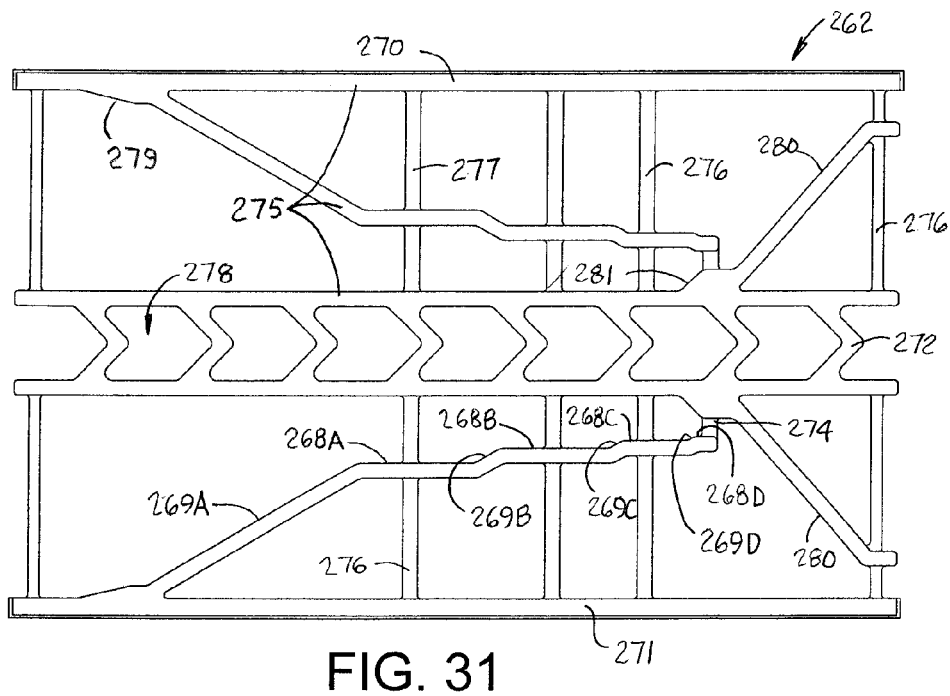
FIG. 31 is a top plan view of the diverter of FIG. 30.

The pushers 234 are translated as the belt 252 advances in the conveying direction 260 by a diverter unit 262 disposed below the conveyor belt and supported in the conveyor frame. In this example, the diverter unit 262 includes two vertical guide surfaces 264, 265 on guide members 266, 267. The guide members 266, 267 are mirror images of each other about the centerline 256 of the belt 252. As better illustrated in FIG. 31, each of the guide surfaces 264, 265 is stepped with four parallel segments 268A-D extending in the conveying direction 260 joined to each other and to side rails 270, 271 by oblique segments 269A-D. The downstream-most parallel segment 268D is connected to a central beam 272 by a cross link 274. The guide unit 262 is strengthened by cross members 276. The entire diverter unit 262 may be molded or machined as a single monolithic piece to avoid crevices at joints that could harbor bacteria, dirt, and other contaminants and to eliminate snag points that could form at misaligned joints in a multi-piece design. In this example, the top surfaces 275 of the guide members 266, 267, the side rails 270, 271, the oblique segments 269A-D, and the central beam 272 are coplanar. The top surfaces 277 of the cross members 276 and the cross links 274 are recessed at a level far enough below the plane of the top surfaces 275 of the guide members, the side rails, the oblique segments, and the central beam to avoid snagging the cam followers on the pushers. Other surfaces 279, 281 on the diverter unit are oriented oblique to the conveying direction to avoid snagging. The coplanarity of the top surfaces 275 provides for lower-pressure contact with the cam followers and allows the diverter unit 262 to serve as the carryway supporting the belt 252. The diverter unit 262 could alternatively be divided into two monolithic halves about the centerline 256 of the belt. Or the guide members, the side rails, the oblique members, the central beam, and the cross members could be manufactured as separate pieces held together by tie rods to ensure coplanarity of the top surfaces. The central beam 272 of the diverter unit 262 is further shown with generous openings 278 for easier drainage and cleaning, as well as for reduced weight.

As shown in FIG. 30, the diverter unit 262 is used to center conveyed articles on the conveyor belt 252. Before encountering the diverter unit 262, the pushers 234 are typically positioned at home positions near the outside ends of the seats 232, 233. As the pushers 234 encounter the first and longest oblique guide segments 269A, they are moved a majority of the distance toward the centerline 256 of the belt 252, but the orientation of the articles is skewed by the obliquely arranged pushers. Along the longer parallel segments 268A-C, the pushers 234 are aligned in the conveying direction 256. Each consecutive parallel segment 268B-D downstream is closer to the centerline 256. Each consecutive oblique diverting segment 269 B-D downstream is shorter in length and diverts a lesser distance inward. The stepped guide surfaces tend to bump conveyed articles, such as rectangular packages, straight, out of skew. Operating the pushers 234 to follow a stepped guide path, rather than a continuously curved guide path, centers conveyed articles while maintaining their original orientations. Downstream of the stepped centering portion, the diverter 262 has a pair of reset guides 280 that guide the pushers 234 back to their home positions near the outside ends of the slots 232, 233.

Figure 32:
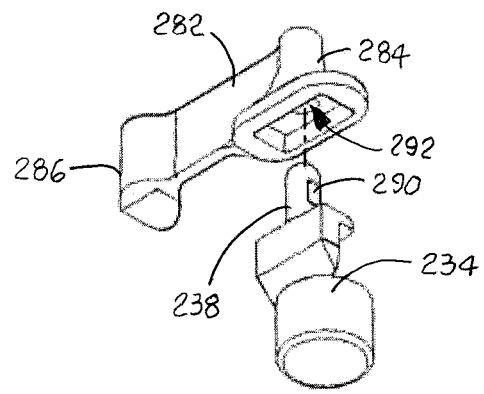
FIG. 32 is an exploded view of a pusher as in FIG. 29 with a finger extension.
Figure 33:
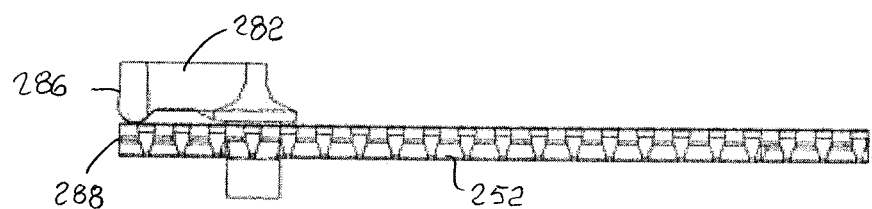
FIG. 33 is a front elevation view of a portion of a belt module with the pusher and finger extension of FIG. 32.

FIGS. 32 and 33 show an attachment that snaps onto the peg portion 238 of the pusher 234. In this example, the attachment is a finger extension 282 that extends from an attachment portion 284 at one end to an article-engaging pusher portion 286 at the opposite end. The finger extension 282 allows the pusher 234 to push articles off the side 288 of the belt 252. In this example, the pusher portion 286 is shown flush with the side 288 of the belt 252 when the peg portion 238 of the pusher 234 is at the end of the slot. Undercut flats 290 on the sides of the peg portion 238 coact with mating structures bounding a cavity 292 in the attachment portion 284 in a snap fit. The attachment 282 is detachable. Besides an extension finger, other detachable attachments that snap onto the peg portion 238 are possible. For example, a detachable disk forming an extension from the peg portion 238 can be used to locate, bump, align, or register conveyed articles.

Figure 34A:
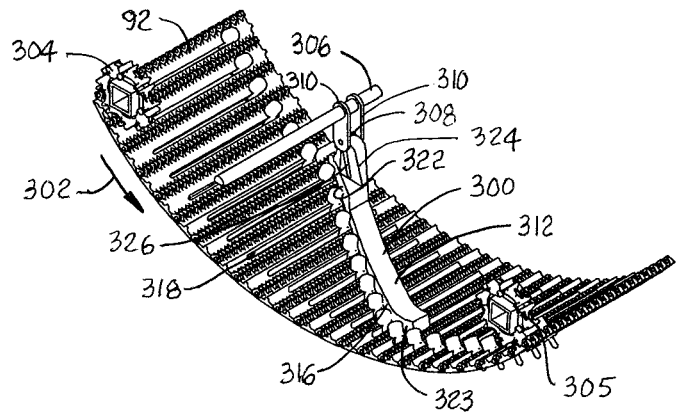
FIGS. 34A-C are isometric, top plan, and side elevation views of a shoe return in the returnway of a conveyor using a diverter belt as in FIG. 9.
Figure 34B:
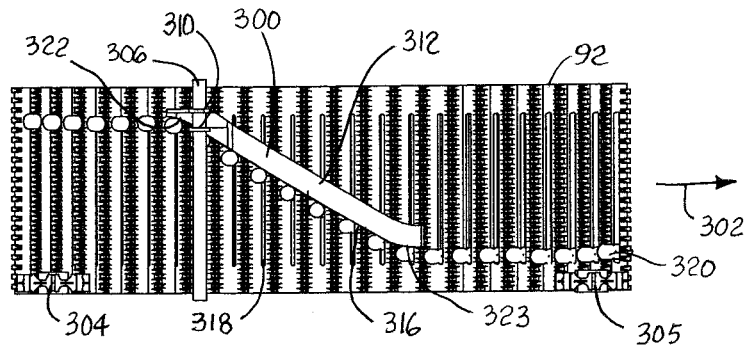
Figure 34C:
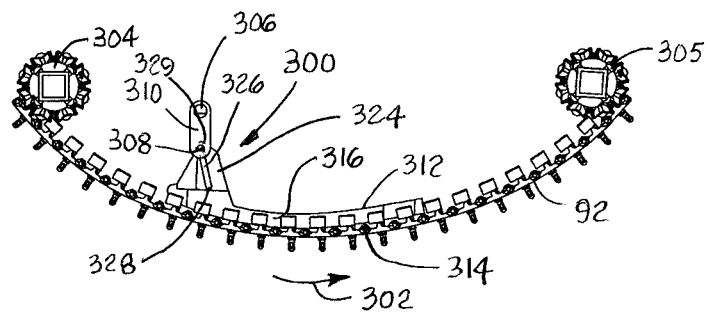

FIGS. 34A-C depict a returnway pusher return 300 used with a diverter belt 92 as in FIG. 9 traveling in the lower returnway below the upper carryway between drive and idle sprockets 304, 305 in a return direction of travel 302. The pusher return 300 is attached to a pin 308 supported between a pair of supports 310 affixed to a cross bar 306 that is mounted in the conveyor frame (not shown). The pusher return 300 includes a diverter arm 312 that extends diagonally across the returnway. The diverter arm 312 has a curved bottom surface 314 that conforms to the bottom side 316 (facing up in the returnway) of the sagging diverter belt 92. The diverter arm 312 also has a side guide surface 316 that guides the lower cam-follower portions 80 of the pushers 76 along their slots 318 to a "home" position 320 as the diverter belt 92 advances along the returnway. The diverter arm 312 has a lead-in portion 322 at an upstream end. In the lead-in portion, the guide surface 316 is curved to ease the pushers into contact with the diverter arm. A lead-out portion 323 at the opposite end of the diverter arm 312 provides the pushers 76 a similar smooth transition from the arm to the "home" position 320. A tongue 324 extends upward from the lead-in portion 322 of the diverter arm 312. The tongue includes an angled slot 326 that is angled off vertical with its lower end 328 downstream of its upper end 329 along the returnway. The pin 308 is received in the angled slot 326 with the tongue 324 between the two supports 310. With the assistance of gravity, the angled slot 326 allows the pusher return 300 to pivot about the pin 308 and move up and down relative to the pin to allow the diverter arm 312 to maintain contact with the belt 92 as it stretches. The angled slot 326 also allows the pusher return 300 to be drawn down to the diverter belt 92 by the drag force of the belt advancing in the return direction 302. In an alternative design, the diverter arm 312 is affixed at one end to the cross bar in a non-pivoting, hard connection that is simpler in design and easier to clean than the pivotable connection shown in FIGS. 34A-C. Because the pusher return 300 in the returnway may be used to replace pusher returns in the carryway, the length of the carryway—and the length of the conveyor—can be shortened. The returnway pusher return may be used with any of the other diverter belts described.

What is claimed is:

1. A conveyor belt comprising:
   a top surface and an opposite bottom surface;
   a first side and an opposite second side separated by the width of the conveyor belt;
   a first region extending inward from the first side toward the second side;
   a second region extending inward from the second side to the first region;
   a plurality of first tracks having first slots extending across the width of the conveyor belt in the first region from a first slot end nearer the first side to a second slot end in the first region;
   a plurality of second tracks having second slots extending across the width of the conveyor belt in the second region from a first slot end nearer the second side to a second slot end in the second region;
   a plurality of pushers arranged to move along the first and second tracks in the first and second slots.

2. A conveyor belt as in claim 1 wherein the first tracks are aligned with the second tracks.

3. A conveyor belt as in claim 1 wherein the length of the first tracks is the same as the length of the second tracks.

4. A conveyor belt as in claim 1 wherein each of the pushers includes a peg extending outward of the top surface and wherein the conveyor belt further comprises an extension detachably attached to the peg and extending from the peg toward the nearer first or second side of the conveyor belt.

5. A conveyor belt as in claim 1 comprising a plurality of belt modules hingedly linked together, wherein at least some of the belt modules each include at least one of the first and second tracks.

6. A conveyor belt comprising:
   a plurality of rows of one or more belt modules, each extending in length from a trailing end to a leading end in a conveying direction, in width from a left side to a right side, wherein the plurality of rows of belt modules are arranged end to end and wherein at least some of the rows of belt modules include:
   an intermediate portion extending in length from the leading end to the trailing end and in width from the left side to the right side and having a top side and an opposite bottom side;
   two or more elongated slots formed in the intermediate portion from the top side to the bottom side and extending in line across the width of the intermediate portion;
   a pusher movably retained in each of the elongated slots to move along the elongated slot, the pusher having an upper portion above the top side of the intermediate portion and a lower cam portion below the bottom side of the intermediate portion.

7. A conveyor belt as in claim 6 further comprising a finger extension detachably attached to the upper portion and extending from the upper portion.

8. A conveyor comprising:
   at least one conveyor belt divided in width between a first side and a second side of the conveyor into two or more parallel regions extending in length along an upper carryway run in a conveying direction and including:
   a plurality of elongated tracks spaced apart in the conveying direction, each of the elongated tracks having a slot extending along the width of the at least one conveyor belt, wherein each of the slots is confined to one of the parallel regions; and
   a plurality of pushers arranged to translate in the slots along the elongated tracks, wherein the pushers include cam followers extending below the at least one conveyor belt;
   a diverter disposed below the at least one conveyor belt along the carryway run and having two or more guide surfaces, each guide surface associated with one of the parallel regions to contact the cam followers and translate the pushers across the associated region as the at least one conveyor belt advances in the conveying direction.

9. A conveyor as in claim 8 wherein each of the guide surfaces comprises:
   a plurality of parallel segments extending in the conveying direction and offset across the width of the at least one conveyor belt; and
   a plurality of oblique segments, each joining consecutive ones of the parallel segments.

10. A conveyor as in claim 9 wherein the lengths of the oblique segments decrease along the conveying direction.

11. A conveyor as in claim 9 wherein the diverter further includes a first side rail having a top surface underlying the first side of the at least one conveyor belt, a second side rail having a top surface underlying the second side of the at least one conveyor belt, a central beam between the first and second side rails having a top surface underlying the at least one conveyor belt, and cross members joining the plurality of parallel segments to the first and second side rails and the central beam, wherein the plurality of parallel segments and the plurality of oblique segments have top surfaces coplanar with the top surfaces of the first and second side rails and the central beam and supporting the at least one conveyor belt.

12. A conveyor as in claim 8 wherein the at least one conveyor belt is divided into two regions, a left region and a right region, and wherein the diverter has a left guide surface defining a stepped left guide path extending in the conveying direction from a position near a left side of the at least one conveyor belt to a position nearer the centerline of the at least one conveyor belt and a right guide surface defining a stepped right guide path extending in the conveying direction from a position near a right side of the at least one conveyor belt to a position nearer the centerline of the at least one conveyor belt.

13. A conveyor as in claim 12 wherein the left guide path and the right guide path are mirror images of each other about the centerline of the at least one conveyor belt.

14. A conveyor as in claim 8 further comprising a pusher return disposed in a lower returnway run below the carryway run and having a guide surface that guides all the pushers in at least one of the parallel regions to a home position in the at least one of the parallel regions.

15. A diverter unit comprising:
a first side rail having a top surface;
a second side rail having a top surface;
guide members having top surfaces and vertical guide surfaces for guiding pushers on a conveyor belt; and
cross members joining the guide members to the first and second side rails;
a central beam between the first and second side rails having a top surface coplanar with the top surfaces of the first and second side rails and the guide members and connected to the first and second side rails and the guide members by the cross members;
wherein the top surfaces of the first and second side rails and the guide members are coplanar to support a conveyor belt.

16. A diverter unit as in claim 15 wherein the cross members are recessed below the top surfaces of the first and second side rails and the guide members.

17. A diverter unit as in claim 15 wherein the diverter is a one-piece molded or machined monolithic structure.

18. A diverter unit as in claim 15 wherein the guide members include alternating parallel segments parallel to the first and second side rails and oblique segments joining consecutive parallel segments so that the guide surfaces are stepped between the first and second side rails.

19. A conveyor comprising:
a conveyor belt having a top side and a bottom side and extending in length along an upper belt carryway run in a conveying direction and including:
a plurality of elongated tracks spaced apart in the conveying direction and extending along the width of the conveyor belt; and
a plurality of pushers arranged to translate along the elongated tracks, wherein the pushers include cam followers extending below the conveyor belt;
a diverter disposed below the conveyor belt in the upper carryway run and having a guide surface that contacts the cam followers to translate the pushers across the conveyor belt as it advances in the conveying direction; and
a pusher return disposed in a lower belt returnway run below the upper belt carryway run and having a guide surface that contacts the cam followers to translate the pushers across the width of the conveyor belt to a home position,
wherein the pusher return has a curved bottom surface that conforms to the upwardly facing bottom side of the conveyor belt sagging in the lower belt returnway run.

* * * * *